United States Patent
Diao et al.

(10) Patent No.: US 7,716,016 B2
(45) Date of Patent: May 11, 2010

(54) METHOD AND APPARATUS FOR AUTOMATIC UNCERTAINTY-BASED MANAGEMENT FEEDBACK CONTROLLER

(75) Inventors: Yixin Diao, White Plains, NY (US); Hidayatullah Habeebullah Shaikh, Mohegan Lake, NY (US); Maheswaran Surendra, Croton-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 278 days.

(21) Appl. No.: 11/479,485

(22) Filed: Jun. 30, 2006

(65) Prior Publication Data

US 2008/0005304 A1 Jan. 3, 2008

(51) Int. Cl.
*G06F 11/30* (2006.01)

(52) U.S. Cl. ............... 702/186; 702/182; 702/184; 709/223; 700/32; 700/54

(58) Field of Classification Search ......... 702/182–183, 702/185–188; 700/20, 28–29, 32, 44–45, 700/51–52, 54
See application file for complete search history.

(56) References Cited

U.S. PATENT DOCUMENTS

| | | | | |
|---|---|---|---|---|
| 5,331,276 A | * | 7/1994 | Polvani et al. | 324/160 |
| 5,875,109 A | * | 2/1999 | Federspiel | 700/40 |
| 6,055,483 A | * | 4/2000 | Lu | 702/31 |
| 2004/0064204 A1 | * | 4/2004 | Frutiger | 700/78 |
| 2005/0049901 A1 | | 3/2005 | Diao et al. | |
| 2005/0086645 A1 | | 4/2005 | Diao et al. | |
| 2005/0268063 A1 | * | 12/2005 | Diao et al. | 711/170 |
| 2005/0273643 A1 | | 12/2005 | Carroll et al. | |
| 2005/0278381 A1 | | 12/2005 | Diao et al. | |

OTHER PUBLICATIONS

"Class-Based Kernel Resource Management," http://ckrm.sourceforge.net/, 2006, pp. 1-3.
"AIX 5L Workload Manager (WLM)," IBM, Redbooks, International Technical Support Organization, www.redbooks.ibm.com/abstracts/sg245977.html, Jun. 2001, 354 pages.

(Continued)

*Primary Examiner*—Hal D Wachsman
*Assistant Examiner*—Mi'schita' Henson
(74) *Attorney, Agent, or Firm*—Louis J. Percello; Ryan, Mason & Lewis, LLP

(57) ABSTRACT

Improved management feedback-based controller techniques are disclosed for use in accordance with a computing system. For example, a method for managing a computing system includes the following steps. At least one measured performance metric is obtained from the computing system being managed. At least one control input value is generated based on parameters including a control error and a control deadzone such that uncertainty associated with the computing system is accounted for in accordance with the parameters. The control error is determined from a computation comprising the at least one measured performance metric and at least one performance metric goal. The control deadzone is defined such that the control input value is not generated when the control error is within the control deadzone. The control input value is sent to the computing system to effectuate achievement of the at least one performance metric goal associated with the computing system.

19 Claims, 6 Drawing Sheets

OTHER PUBLICATIONS

A. Dave et al., "IBM eServer® i5 and iSeries™ Logical Partitioning FAQs," IBM, http://www-03.ibm.com/servers/eserver/iseries/Ipar/, Jun. 2004, pp. 1-12, Version 1.00.

"Linux: Xen 2.0 Released," KernelTrap.org, http://kerneltrap.org/node/4168, Nov. 2004, pp. 1-3.

D.A. Menascé et al., "Preserving QoS of E-Commerce Sites Through Self-Tuning: A Performance Model Approach," Proceedings of the ACM Conference Electronic Commerce, Oct. 2001, 11 pages., Florida.

B. Urgaonkar et al., "Dynamic Provisioning of Multi-Tier Internet Applications," Proceedings of the 2nd IEEE International Conference on Autonomic Computing (ICAC-05), 2005, pp. 1-12.

Y. Diao et al., "Incorporating Cost of Control Into the Design of a Load Balancing Controller," Proceedings of IEEE Real-Time and Embedded Technology and Application Systems Symposium, May 2004, pp. 376-387, Canada.

Y. Diao et al., "Using MIMO Linear Control for Load Balancing in Computing Systems," Proceedings of the American Control Conference, Jun. 2004, pp. 2045-2050, Boston.

Y. Diao et al., "Comparative Studies of Load Balancing with Control and Optimization Techniques," Proceedings of American Control Conference, Jun. 2005, pp. 1484-1490, Oregon.

* cited by examiner

METHOD AND APPARATUS FOR AUTOMATIC UNCERTAINTY-BASED MANAGEMENT FEEDBACK CONTROLLER

FIELD OF THE INVENTION

The present invention relates to computing systems, and, more particularly, to techniques for management of such computing systems.

BACKGROUND OF THE INVENTION

Most Internet service sites such as electronic commerce (e-commerce) web sites have a multi-tier computing system architecture that partitions the processing of web requests into tiers or stages. Such a multi-tier architecture may, for example, include an edge server stage, an Hypertext Transport Protocol (HTTP) server stage, an application server stage, and a database server stage.

Management systems are typically used to monitor the performance of the computing system and to cause actions to be taken to address performance problems. Feedback control is desired in such management systems in order to handle computing system dynamics and disturbances. However, the design and deployment of existing management feedback-based controllers is known to be quite complicated. For example, the system dynamics need to be modeled through linear or nonlinear models, and the feedback control law needs to be designed to satisfy certain closed loop system performance criteria.

Accordingly, it would be desirable to provide an improved management feedback-based controller for use in accordance with one or more tiers of a computing system.

SUMMARY OF THE INVENTION

Principles of the invention provide an improved management feedback-based controller for use in accordance with a computing system.

For example, in a first aspect of the invention, a method for managing a computing system includes the following steps. At least one measured performance metric is obtained from the computing system being managed. At least one control input value is generated based on parameters including a control error and a control deadzone such that uncertainty associated with the computing system is accounted for in accordance with the parameters. The control error is determined from a computation comprising the at least one measured performance metric and at least one performance metric goal. The control deadzone is defined such that the control input value is not generated when the control error is within the control deadzone. The control input value is sent to the computing system to effectuate achievement of the at least one performance metric goal associated with the computing system.

The step of generating the at least one control input value may further include determining a control interval parameter. Determination of the control interval may be based on a mean response time, a standard deviation of the response time, a system throughput, and a desired standard/mean response time ratio.

The step of generating the at least one control input value may further include determining a control step size parameter.

The performance goal may be achieved when the control error is substantially equal to zero.

A size of the control deadzone may be computed as a function of a threshold limit value and the measured response time. The threshold limit value may be adjusted based on a control input history. The control input history may include data relating to at least one of an oscillation pattern and a chasing pattern.

In a second aspect of the invention, a method for managing a computing system includes the following steps. Multiple measured performance metrics are obtained from the computing system being managed. The multiple measured performance metrics are applied to multiple controllers. Each controller generates a control input value based on a control error and a control deadzone, wherein the control error is determined from a computation comprising one of the multiple measured performance metric and a performance metric goal, and further wherein the control deadzone is defined such that the control input value is not generated when the control error is within the control deadzone. One or more control input values computed by one or more of the multiple controllers are sent to the computing system to effectuate achievement of one or more performance metric goals associated with the computing system.

In a third aspect of the invention, a system includes a managed system and a feedback control system coupled to the managed system. The feedback control system is operative to: (i) obtain at least one measured performance metric from the managed system; (ii) generate at least one control input value based on a control error and a control deadzone, wherein the control error is determined from a computation comprising the at least one measured performance metric and at least one performance metric goal, and further wherein the control deadzone is defined such that the control input value is not generated when the control error is within the control deadzone; and (iii) send the control input value to the managed system to effectuate achievement of the at least one performance metric goal associated with the managed system.

In a fourth aspect of the invention, a method for managing one or more resources associated with a system in a dynamic environment includes the following steps. A controller is used to incorporate a characterization of uncertainty associated with the system. The system is modeled using real time data including one or more system metrics indicative of an extent to which a goal is being achieved by the system. One or more controller parameters including controller self-evaluation are determined in order to be responsive to the system uncertainty. The system goal is caused to be achieved in accordance with the controller, the one or more system metrics, and the one or more controller parameters.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
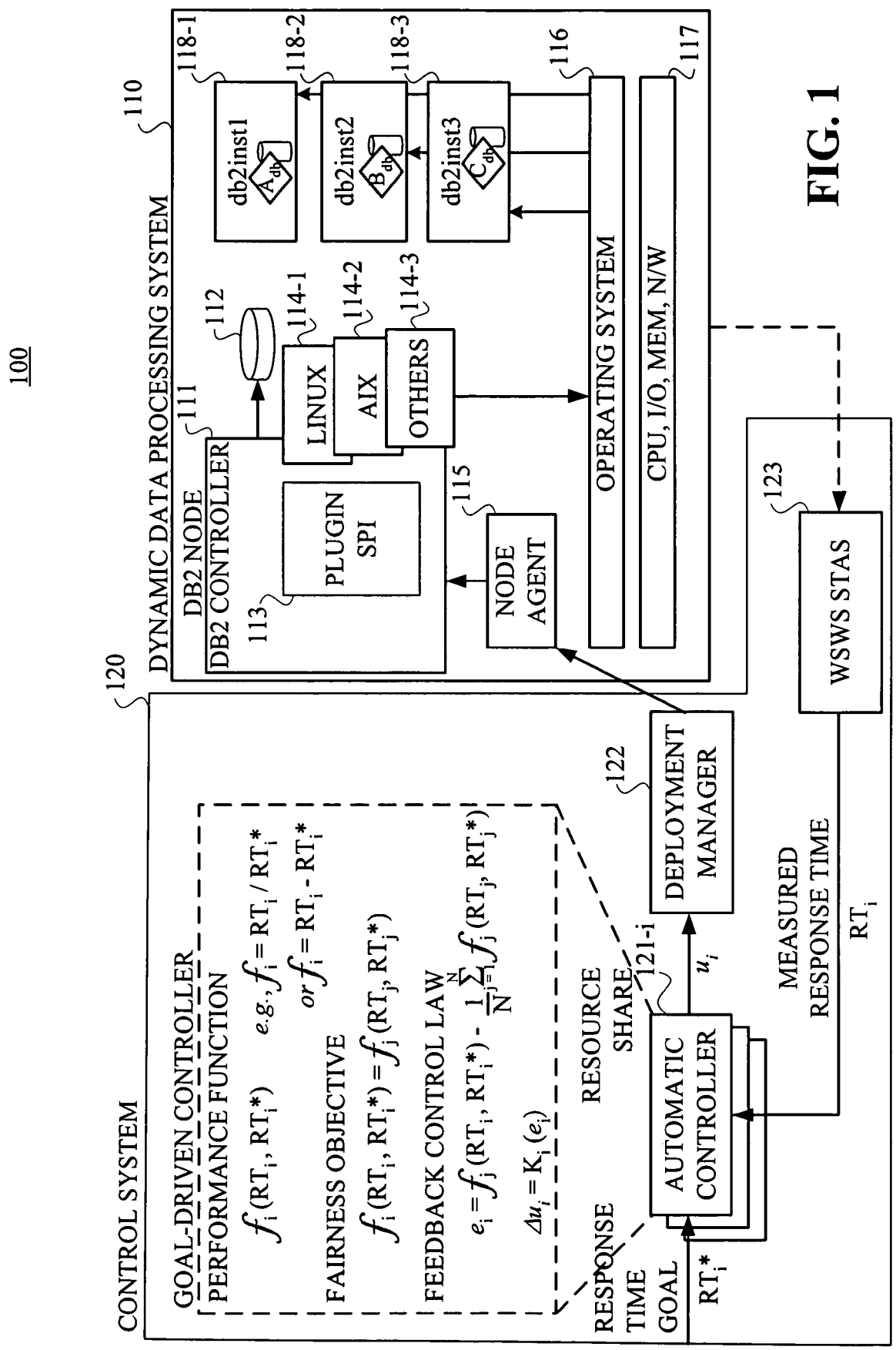
FIG. 1 illustrates a computing system environment in which control techniques of the invention are implemented.

It is to be understood that the present invention is not limited to any particular computing system architecture. Rather, the invention is more generally applicable to any computing system architecture in which it would be desirable to provide a management feedback-based controller that is simpler to design and deploy in a computing system, as compared with existing management feedback-based controllers.

Generally, in a multi-tier computing system architecture, each tier includes one or more nodes (e.g., hardware entities) that are dedicated to a specific kind of processing. For example, a first tier may be an edge server tier that provides load balancing and request routing. A second tier may be an HTTP server tier that performs HTTP parsing and response generation. A third tier may contain application servers typically providing a Java 2 Platform Enterprise Edition (J2EE) for business logic (e.g., the software used to execute the particular e-commerce application). A fourth tier may contain database server nodes that manage persistent data. The architecture may include a fifth tier as well, if a separate storage system is used (e.g., a storage area network).

Client requests enter the first tier and are routed to an HTTP server. Some fractions of the HTTP requests also require processing by application servers. A fraction of the requests processed by application servers also require services from a database server. Because inter-tier interaction is synchronous, threads/processes in upstream tiers are blocked while waiting for the completion of processing in downstream tiers. Thus, requests may simultaneously consume resources in the HTTP, application, and database server nodes. After processing by some or all of the tiers of the multi-tier computing system, a response to the request is sent to the client.

As will be illustratively described, principles of the invention provide a simplified approach for autonomic controller design and deployment. It is to be understood that the term "autonomic," as illustratively used herein, generally means functionally independent or not under voluntary control. Such term will be interchangeably used herein with the terms "automated" or "automatic." The autonomic controller design and deployment approach, according to illustrative principles of the invention, includes three main aspects:

(1) Performance goal decomposition. Feedback-based controllers are generally used for tracking and regulation problems. We decompose optimization-oriented (multiple) performance goals so that the task can be fulfilled using (multiple) single-input single-output controllers.

(2) Bang-bang control law. Although a rich set of control laws has been studied in control literature, most are model-based and thus require extensive modeling and adaptation. We provide a simplified control law based on so-called bang-bang logic.

(3) Autonomic design and deployment. We provide a set of methods that enables controller configuration with minimum effort that can be automatically performed for a variety of simple and complex systems.

FIG. 1 illustrates a portion of a computing system environment in which design and control techniques of the invention are implemented. As shown, environment 100 includes a dynamic data processing system 110. It is to be appreciated that the data processing system can be one tier, i.e., a database server tier, of a multi-tier computing system, as described above. However, it is to be understood that principles of the invention are not limited to implementation with any particular computing system or any particular tier thereof. Further, as shown, the data processing system employs a control system 120 for optimizing the performance of constrained resources of the data processing system.

As illustrated in FIG. 1, data processing system 110 includes database controller 111, database 112, plug-in service provider interface (SPI) 113, plug-ins 114-1 through 114-3, node agent 115, operating system 116, constrained resources 117 (central processing unit, input/output, memory, network bandwidth), and database instances 118-1 through 118-3. Collectively, the exemplary components shown in block 110 are considered a database node to be managed by the control system 120. While the database node may implement any database technology, in one embodiment, the database employed is DB2™ from IBM Corporation, Armonk, N.Y.

Further, as shown, control system 120 includes automatic controller 121 (features of which are further illustrated in the dotted block above controller block 121 in FIG. 1), deployment manager 122, and WSWS Stas 123.

It is to be appreciated that "WSWS Stas" refers to a WebSphere™ Workload Simulator statistics collector. While the invention is not limited to any particular management environment, it is particularly well suited for use in a WebSphere™ Deployment Management environment (IBM Corporation of Armonk, N.Y.). In such an embodiment, a WSWS may be used to report performance metrics such as response time. It is to be appreciated, however, that other existing statistics collectors may be used.

It should be noted here that automatic controller 121 shown in FIG. 1 may represent multiple (i) individual controllers (thus, the notation 121-$i$) in an embodiment where performance management is decomposed into multiple individual service classes. Such an embodiment will be further explained in detail below.

Node agent 115 receives control and configuration commands from deployment manager 122, and serves to extend the management capability of the deployment manager. The management extensions to the node agent provide an abstract interface to the deployment manager 122, independent of the underlying virtualization technologies such as OS WLM (e.g., Linux CKRM, AIX WLM, HP-UX WLM, Solaris Resource Manager) and partitioning technologies such as dynamic LPAR, Linux Xen, Meiosys Metacluster, etc. CKRM refers to class-based kernel resource management (http://ckrm.sourceforge.net/), AIX WLM refers to a workload management system (http://www.redbooks.ibm.com/abstracts/sg245977.html), dynamic LPAR refers to dynamic logical partitions (http://www-03.ibm.com/servers/eserver/iseries/lpar/) and Linux Xen is described at http://kerneltrap.org/node/4168. Such exemplary plug-in modules are generally represented by 114-1 through 114-3 in FIG. 1. Further, the implementation of this interface may be based on open standards such as Java Management Extensions or Web Services Distributed Management (WS-DM).

As shown in FIG. 1, DB controller 111 provides abstraction from platform specific workload management capability. DB controller 111 defines a Service Provider Interface (SPI) 113 that is implemented by the database node. Such an abstraction layer contains the logic to interact with any management infrastructure such as JMX or WS-DM. JMX: Java Management Extensions, are described at http://java.sun.com/products/JavaManagement/, and WS-DM: Web Services Distributed Management is described at (www.oasis-open.org/committees/wsdm/).

It is to be appreciated that computing system 100 shown in FIG. 1 may employ the management model described in the U.S. patent application entitled "Method And Apparatus For Cross-Tier Management In Multi-Tier Computing System Architecture," filed concurrently herewith, and incorporated by reference herein.

Turning now to control system 120, automatic controller 121-*i* receives as input a response time goal and a measured response time. By way of example, "response time" may refer to a time attributable to the generation of a response to a client query (as may have been received from another tier of the computing system, such as the application server tier). While the response time goal may be pre-stored on the controller or readily available from some other source, the measured response time is fed back from data processing system 110 via WSWS Stas 123.

Controller 121 compares the response time goal and the measured response time and, based on the result of the comparison, computes the resource share for the database instances (i.e., the portion of resources 117 used to support database instances 118-1 through 118-3). In general, by way of example, if the measured response time is larger than the response time goal, more resources will be allocated (i.e., larger resource share) to service subsequent client requests. Alternatively, if the measured response time is smaller than the response time goal, less resources will be allocated (i.e., smaller resource share) to service subsequent client requests.

It is to be appreciated that response time is just an example of a performance metric that can be applied. Other metrics such as throughput and bandwidth can also be applied. Also it is to be understood that, in the example of three database instances 118-1 through 118-3, each instance may correspond to a separate response time goal. Thus, there will be three measured response times, three response time goals, and three controllers 121-1 through 121-3.

The resource share is sent to deployment manager 122, which then sends appropriate commands to node agent 115 to effectuate the deployment of the resources. The automatic controller operates iteratively so as to provide efficient and accurate run-time control and adjustment of resource deployment.

It is to be appreciated that feedback-based controllers typically implement goal-driven algorithms. They are generally used for tracking (to follow the varying goals) and regulation (to reject the effects from disturbances) problems. However, illustrative principles of the invention realize that a feedback-based controller can be extended to handle both single and multiple service class objectives. In this case, the optimization-oriented (multiple) performance goals are decomposed so that the task can be fulfilled using (multiple) single-input single-output controllers.

That is, each service class would have its own response time goal associated therewith, e.g., wherein a higher priority service class would have a smaller response time goal than that of a lower priority service class. In practice, clients would pay a higher service fee for a higher priority service class (with a smaller response time goal) than for a lower priority service class (with a larger response time goal). In accordance with such multiple performance goals, one embodiment of the invention decomposes the multiple goals into individual goals implemented by individual functional controllers. Thus, as shown in FIG. 1, the performance function is indexed by variable i such that there are as many controllers (121-*i*) as there are service classes i.

We now give further details of the features implemented by automatic controller 121.

Controller 121 implements a performance function that is defined per service class i as:

$$f_i(RT_i, RT_i^*)$$

where $RT_i$ is the measured response time and $RT_i^*$ is the response time goal. The performance function can take different formats such as:

$$f_i = RT_i / RT_i^*$$

$$f_i = (RT_i^* - RT_i) / RT_i^*$$

$$f_i = RT_i - RT_i^*$$

The importance of different service classes can also be incorporated into this performance function through an importance factor (or weight) linearly, piecewise-linearly, or nonlinearly.

Furthermore, controller 121 is designed to achieve the fairness objective, i.e.:

$$f_i(RT_i, RT_i^*) = f_j(RT_j, RT_j^*)$$

for different service classes i and j. This fairness objective can be reflected by defining the reference signal:

$$\frac{1}{N} \sum_{j=1}^{N} f_j(RT_j, RT_j^*)$$

and the control error:

$$e_i = f_i(RT_i, RT_i^*) - \frac{1}{N} \sum_{j=1}^{N} f_j(RT_j, RT_j^*)$$

An objective of feedback controller is to drive the control error to zero. This is achieved by a set of controller values:

$$\Delta u_i = K_i(e_i)$$

Figure 2:
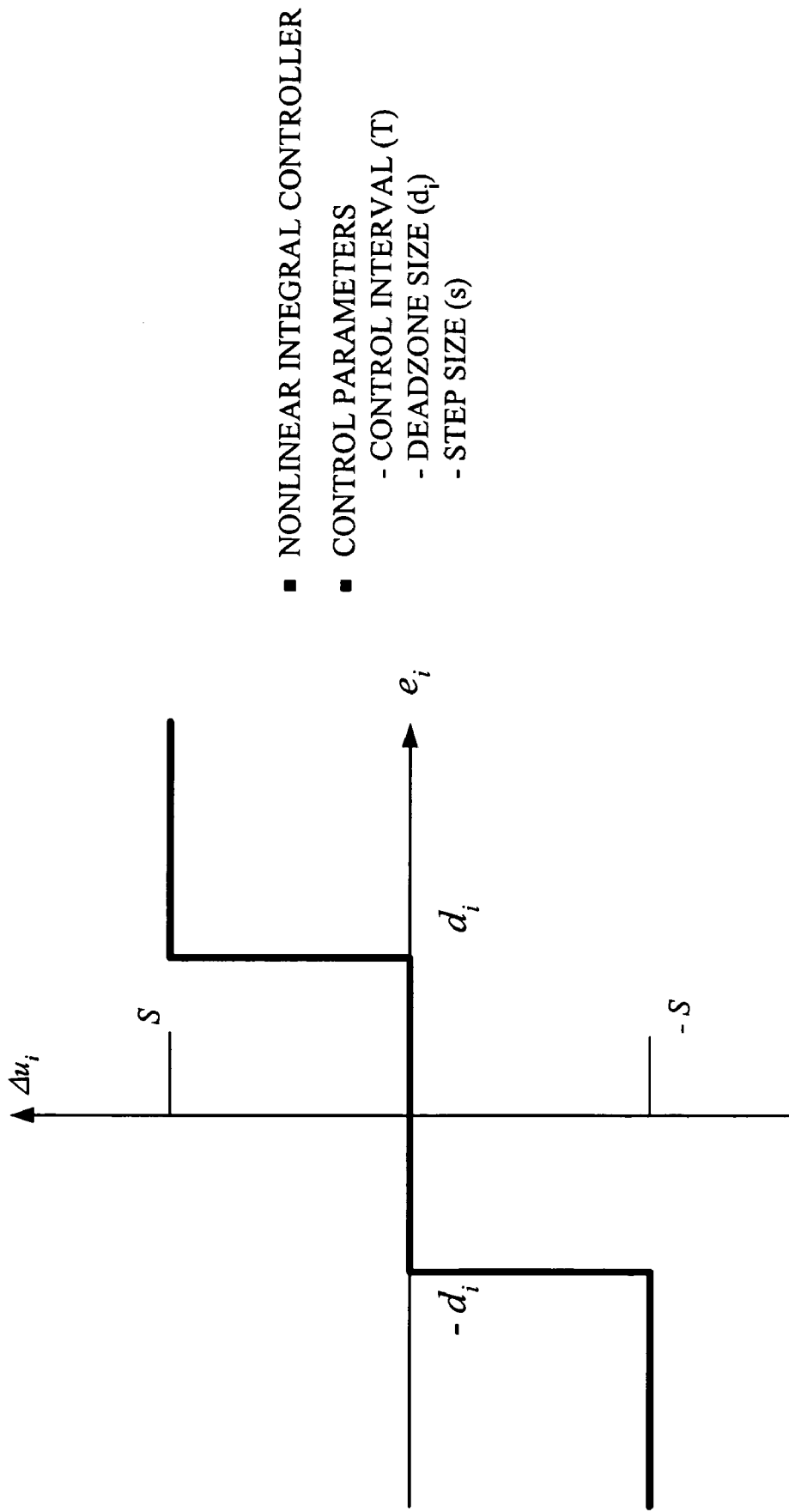
FIG. 2 illustrates a control law, according to an embodiment of the invention.

Such a set of controller values is used to compute the changes of control input $u_i$ based on the control errors. This control input is denoted as the resource share being output from controller 121-*i*. $K_i(\ldots)$ is a function that defines the relationship between $e_i$ and $\Delta u_i$. One example is shown in FIG. 2. Another example is $\Delta u_i = K_i * e_i$, which indicates an integral controller. It is to be appreciated that many other formats from feedback control theory are possible for $K_i(\ldots)$. Further restrictions on the control input can also be imposed if, for example:

1. The range of the control input is restricted, e.g., the CPU (central processing unit) share must be in the range of 10 and 90 (considering the minimum CPU requirement to avoid database failures and the other demands from system operations).

2. The granularity of the control input is restricted, e.g., the CPU share can only be changed in terms of 0.1 CPU processor units (i.e., CPU units can only be 0.1, 0.2, 0.3, ..., 0.9, but not, for example, 0.15]

3. The dependency between the control inputs is restricted, e.g., the sum of the CPU shares from two database instances must be less than or equal to 90 percent.

Generally, the above-described feedback control architecture of controller 121 can handle many types of control problems, by way of example:

1. Single-input single-output tracking/regulation problems. For example, adjust the buffer size of a Lotus Notes email server (MaxUsers) to let the system response time following the given goal.
2. Single-input single-output optimization problems. For example, adjust the concurrency level of an Apache web server (MaxClients) to minimize the system response time.
3. Multi-input multi-output tracking/regulation problems. For example, adjust the Apache web server's HTTP (HyperText Transport Protocol) session time out values (KeepAlive) and concurrency level (MaxClients) to maintain the desired CPU and memory utilizations.
4. Multi-input multi-output optimization problems. For example, adjust the memory pool sizes of a DB2 UDB database server to optimize the memory utilizations. Another example is to adjust the CPU shares of database instances to achieve differentiated services.

Although a rich set of control laws have been studied in control literature, most are model-based and thus require extensive modeling and adaptation. In accordance with illustrative principles of the invention, we provide a simplified control law based on so-called "bang-bang" logic. Bang-bang logic is described, for example, in "Nonlinear and Optimal Control Systems," Thomas L. Vincent, Walter J. Grantham, Wiley-IEEE, 1997. The bang-bang controller is an on-off controller. In accordance with illustrative principles of the invention, we integrate the bang-bang controller with the integral control law and a deadzone for stability and simplicity of construction.

FIG. 2 graphically illustrates the operation of a bang-bang controller. In one embodiment, automatic controller 121 is implemented as such a bang-bang controller. The x-axis of graph 200 denotes the control error and the y-axis denotes the change in control input for controller i. A deadzone (with a size of $d_i$) is defined so that no control input adjustment $\Delta u_i$ will be given if the control error is within this zone (between $-d_i$ and $d_i$). If the control error $e_i$ is larger than that, the control input will be adjusted by a step size s. Note that although the deadzone size can be different for different controllers, the step size is always the same. This facilitates the resource reallocation between different controller/managed systems. Without loss of generality, we assume a system with a positive response. That is, for a positive control error, i.e., the response time is larger than the average response time, the control input will be increased to reduce the control error.

The bang-bang controller operates periodically based on the control interval in order to drive the control error within the deadzone. Afterwards, the controller still operates to monitor the control errors but will not further adjust the control input until the workload changes, which drives the control error out of the deadzone.

In the case where a control input dependency exists, certain projection algorithms can be applied. For instance, suppose all the control inputs need to be positive and the sum of them equal to U. We can put the service classes into two groups: the increase group ($e_q > d$ & $u < U-s$, $q=1, \ldots, Q$) and the decrease group ($e_q < d$ & $u_q > s$, $q=1, \ldots, Q$).

If the number of entries in the increase group is smaller than or equal to that in the decrease group ($P <= Q$), we will increase all the entries in the increase group by s, but only decrease the first P entries in the decrease group by s. Otherwise, if the number of entries in the increase group is larger than that in the decrease group ($P > Q$), we will increase the first Q entries in the increase group by s, and decrease all the entries in the decrease group by s.

Overall, the performance and effectiveness of a bang-bang controller is determined by three control parameters: (1) control interval T; (2) deadzone size $d_i$; and (3) step size s.

We now present a set of methods that enable controller configuration (e.g., controller 121-$i$ of FIG. 1) with minimum efforts that can be automatically performed for a variety of simple and complex systems. As will be seen, such methods are able to take into account workload and system behaviors.

Figure 3:
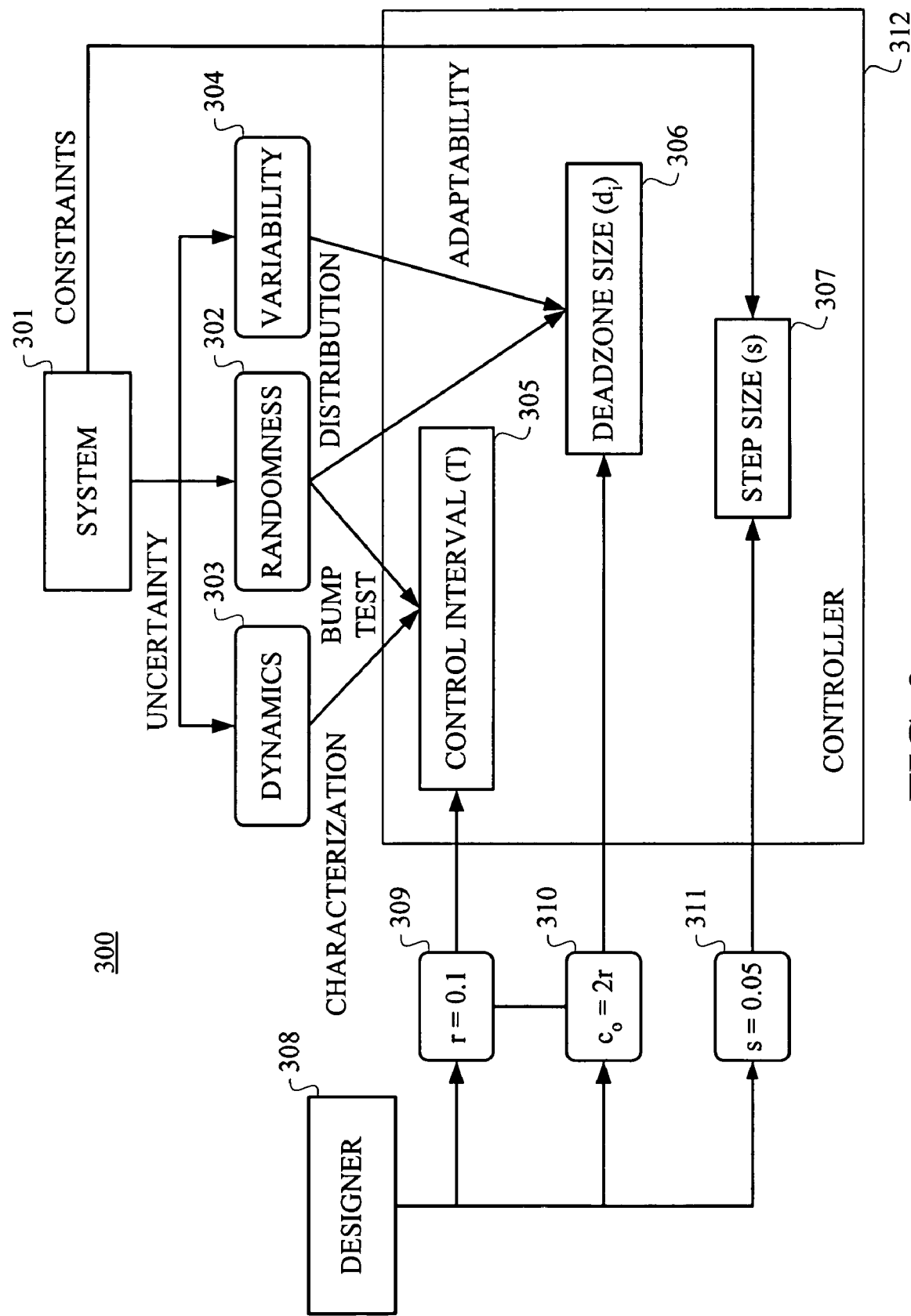
FIG. 3 illustrates a controller design methodology, according to an embodiment of the invention.

FIG. 3 illustrates a process 300 for controller design.

A feedback controller is an automatic system (block 312) for uncertainty management of the managed system (block 301). The uncertainty of the managed system (301) mainly occurs in three forms:

1. Randomness (block 302). Measurement noise always exists for engineering systems. The measured data vary greatly for computing systems due to the underlying discrete event nature of the workload.
2. Dynamics (block 303). Dynamics exist in many places of the system. An actuator pure delay may occur from a controller initiating a control input change to a control command taking effect in the system. A system capacity delay may occur from a control command taking initial effect to full effect. A sensor delay may also occur for performance data collection.
3. Variability (block 304). Both the system configuration (e.g., hardware and software) and workload behaviors (e.g., user session intensity and composition) can vary over time. Thus, robustness and adaptability are desired for the feedback controller (e.g., through robust control and/or adaptive control methodologies).

By using the bang-bang control logic and the three control parameters defined above, a designer 308 is able to design the feedback controller 312 to accommodate the system uncertainty based on design criteria such as standard/mean ratio r (309), initial deadzone ratio $c_0$ (310), and step size s, as will be explained further below.

A. Control Interval T (block 305 of FIG. 3)

We use the control interval to handle system randomness and dynamics. Intuitively, if the data variability is high, we need a larger control (sample) interval for meaningful performance measurement and control.

We control the average response time. According to the Central Limit Theorem, the distribution of a sample average tends to be normal, even when the underlying distribution of each sample is non-normal. Furthermore, this distribution of the average will have the same mean as the parent distribution and variance equal to the variance of the parent divided by the sample size (N).

Figure 4:
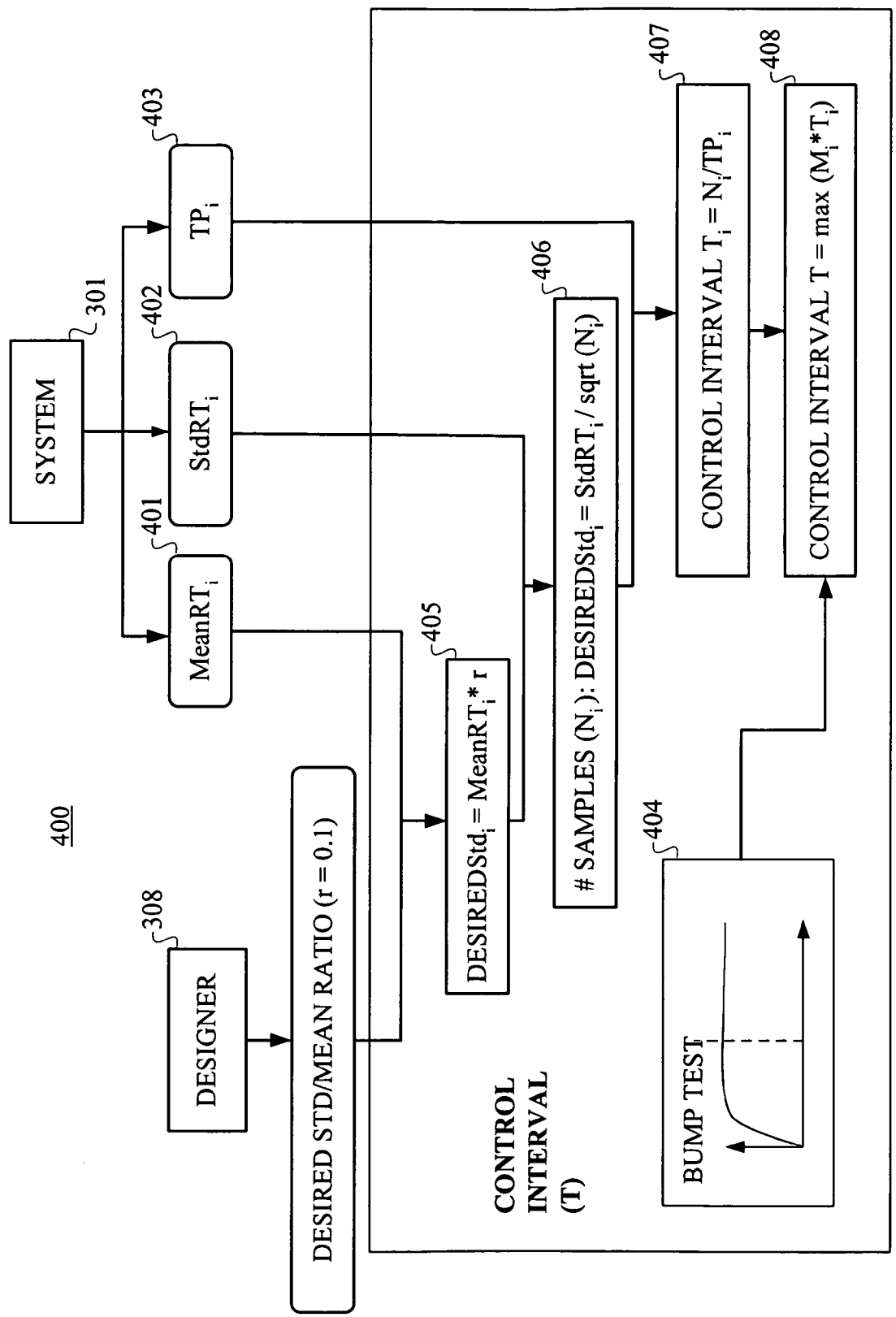
FIG. 4 illustrates a control interval determination methodology, according to an embodiment of the invention.

FIG. 4 illustrates a process 400 for control interval determination. During the controller initialization phase, we need to get the estimates of the mean response time (MeanRT 401), the standard deviation of the response time (StdRT 402), and the system throughput (TP 403).

If we assume the response time takes exponential distribution, since its standard deviation is equal to its mean, we only need to estimate MeanRT and TP. This can be done through an iterative procedure:

1. Set an initial observation window size (W seconds) and set MeanRT_old=0 and TP_old=0.
2. Compute MeanRT and TP from the observation window.
3. Compute the error (MeanRT-MeanRT_old)/MeanRT and (TP-TP_old)/TP.

4. If the error falls within a tolerance threshold, terminate; otherwise, MeanRT_old=MeanRT, TP_old=TP, W=W*2, go to step 2.

If the response time distribution is non-exponential, the following procedure can be used instead:
1. Set an initial observation window size (W seconds) and set MeanRT_old=0, TP_old=0, and StdTP_old=0.
2. Compute MeanRT_k and TP_k from K observation windows, k=1, 2, ..., K.
3. Compute TP=mean(TP_k), MeanRT=mean(MeanRT_k), and StdRT=std(MeanRT_k)*sqrt(TP).
4. Compute the error (MeanRT-MeanRT_old)/MeanRT, (TP-TP_old)/TP, and (StdRT-StdRT_old)/StdRT.
5. If the error falls within a tolerance threshold, terminate; otherwise, MeanRT_old=MeanRT, TP_old=TP, StdRT_old=StdRT, W=W*2, go to step 2.

We can set the initial window size W=5 seconds, and K=20.

Given the desired std/mean ratio (r) from the designer (typically, we choose r=0.1), we can compute the control interval (T) as follows:

DesiredStd=MeanRT*$r$ (box 405)

DesiredStd=$StdRT/sqrt(N)$ (box 406)

T=N/TP (box 407)

Although system dynamics can be explicitly modeled, we handle it in a simplified way, i.e., choose a large enough control interval so that the model becomes zero order. Through a bump test 404, the overall steps for computing the control interval are as follows.
1. Run the system under the initial configuration parameters, and compute the control interval T using the above steps and get MeanRT_init.
2. Change the configuration parameters to a new setting at time t0. Set MeanRT_old=0 and M=1.
3. Compute MeanRT at interval (t0+(M−1)*T, t0+M*T].
4. Compute the error (MeanRT-MeanRT_old)/MeanRT.
5. If the error falls within a tolerance threshold and MeanRT is different than MeanRT_init, terminate; otherwise, MeanRT_old=MeanRT, M=M+1, go to step 3.

The control interval is computed as M*T. Each managed system may have different dynamics and thus the corresponding controller may have different control intervals. In order to have a single control interval for all controllers, we use the maximum value of the control intervals that are computed for all individual controllers (box 408). This facilitates resource exchange between different controllers and managed systems.

Given control interval T, at the k-th control interval t_k, the values MeanRT will be computed from interval (t_k−T, t_k] to avoid the impact of dynamics.

B. Deadzone Size $d_i$ (block 306 in FIG. 3)

We use the deadzone size to increase robustness to system randomness and dynamics. The bang-bang control logic assumes the sign of the model (e.g., an increase in control input results in a decrease in control error). Due to the effect of randomness (which cannot be totally eliminated through control interval selection and may vary over time), the deadzone is included to avoid controller oscillation. Included in box 306, the deadzone size can be defined by:

$d_i=c_iRT_i$ (box 507)

where $c_i$ is the threshold limit. The larger the threshold limit, the less oscillation, but the larger the steady error. The smaller the limit, the more oscillation, but the smaller the steady error. Typically, we select the initial value of the threshold limit to be $c_0$=2r (box 310). Since r is the ratio between the standard deviation and mean, this implies a deadzone size that doubles the standard deviation of the response time. The idea behind this is that no control action should be involved to compensate for the measurement noise. Control action is only needed when abnormal changes occur.

Generally, a larger deadzone size may be preferred if the cost of control is large, because in this case we do not want the controller to oscillate too much.

Figure 5:
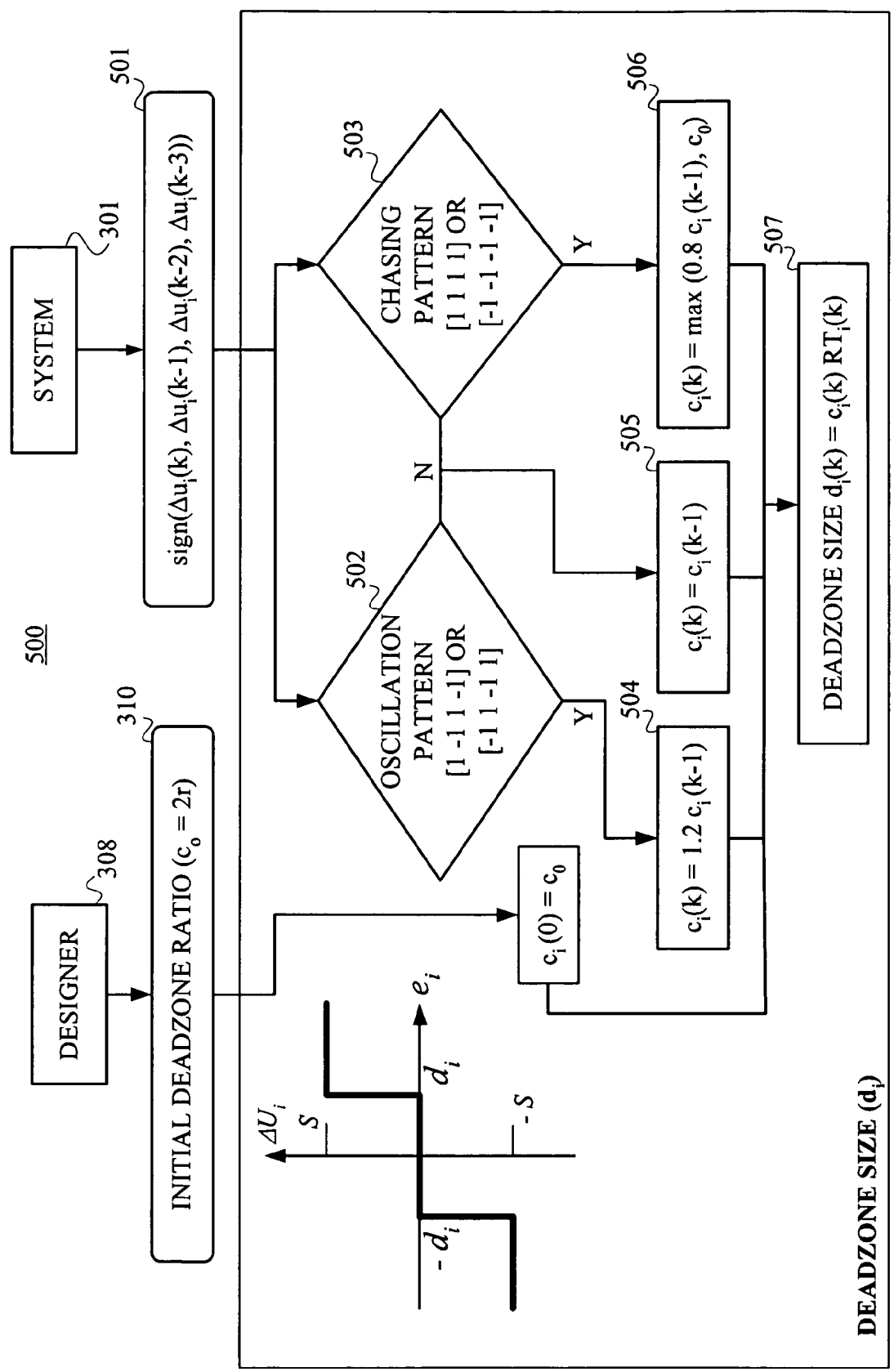
FIG. 5 illustrates a deadzone size determination methodology, according to an embodiment of the invention.

In the case where system changes and the deadzone size becomes inappropriate, a oscillation-induced deadzone adaptation algorithm is introduced as follows and illustrated in FIG. 5:
1. Observe the control input history and record the sign of control input change (box 501)
2. If an oscillation pattern is detected and lasts for a while (i.e., the number of increases is equal to the number of decreases, e.g., 1, −1, 1, −1, or −1, 1, −1, 1) (box 502), increase the threshold limit by 20% (box 504).
3. If a chasing pattern is detected (e.g., 1, 1, 1, 1, or −1, −1, −1, −1) and lasts for a while (box 503), decrease the threshold limit by 20% but not less than the $c_0$ (box 506).
4. If none of the oscillation or chasing patterns are detected, the threshold limit remains the same (box 505)
5. Finally, the deadzone size is computed based on threshold limit and the response time (box 507).

C. Step Size s (block 307 in FIG. 3)

We use the step size for the performance of controller convergence (box 307). A larger step size results in a faster initial response, but the controller may oscillate around the optimal point if the step size is too large and makes the control error bounce around the deadzone. To the contrary, a smaller step size leads to longer convergence time. We illustratively choose s=0.05, that is, 5% of the control range. This implies a maximum of 20 intervals of convergence time. Compare to s=0.01, the maximum difference is 0.02, which should be tolerable with respect to the control performance.

In the case where a constraint is put on the granularity of the step size, this may lead to too large a step size and controller oscillation (one step size change causes the control error bounce around the deadzone). In this case, by observing oscillation, the oscillation-induced deadzone adaptation algorithm can also help to reduce the oscillation by increasing the deadzone size.

It is to be understood that an automatic controller of the invention can work under the effect of workload variation. For example:
1. Operating point of the workload changes. This can be for different arrival rate, service rate, or control goal. The feedback controller will operate to achieve the goal.
2. Variance of the workload increases. Note that the deadzone size can change based on the oscillation-induced deadzone adaptation algorithm. In addition, simulation results show that the controller can still have good performance for three times larger Std (or 10 times larger variance) even without deadzone adaptation. Furthermore, we can also keep monitoring the StdRT and adjust the control interval accordingly.
3. Variance of the workload increases. The controller will perform the same as before.

Figure 6:
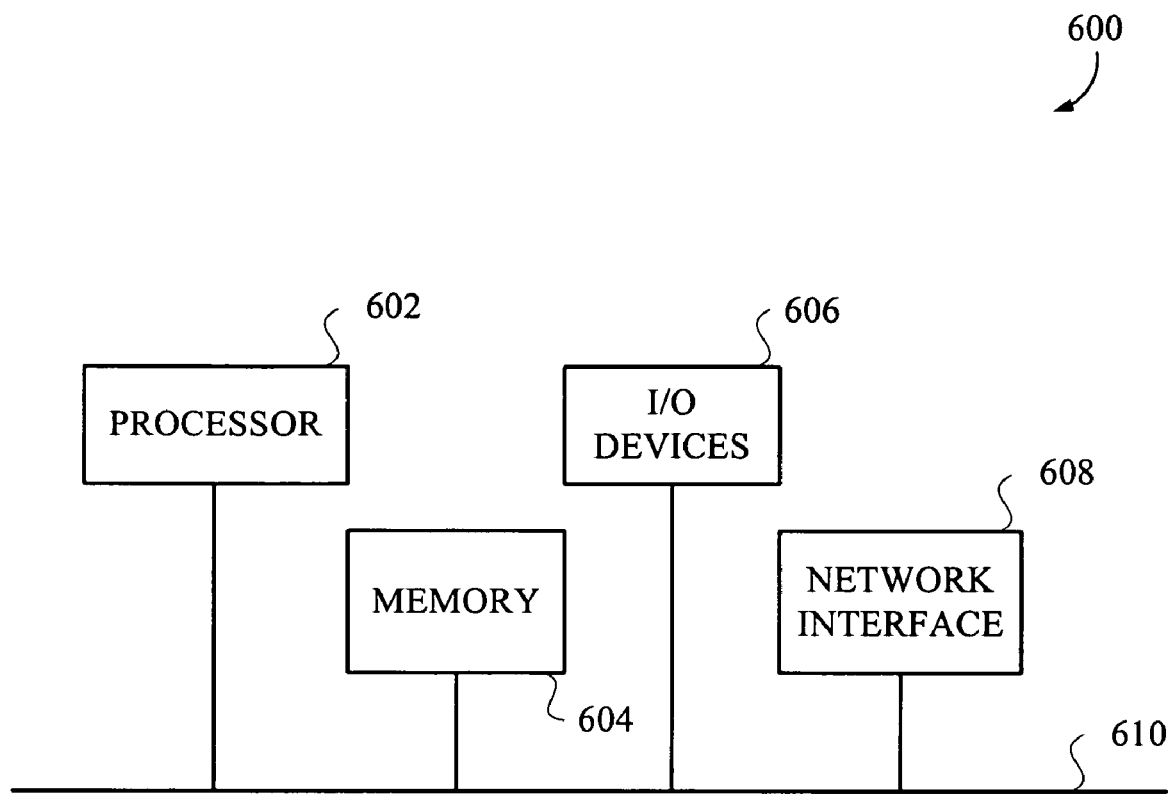
FIG. 6 illustrates a computer system used for implementing controller design and deployment techniques, according to an embodiment of the invention.

Referring lastly to FIG. 6, a block diagram illustrates an illustrative hardware implementation of a computer system in accordance with which one or more components/steps of a management control system (e.g., components/steps described in the context of FIGS. 1 through 5) may be implemented, according to an embodiment of the present invention.

Further, it is to be understood that the individual components/steps may be implemented on one such computer system, or more preferably, on more than one such computer system. In the case of an implementation on a distributed system, the individual computer systems and/or devices may be connected via a suitable network, e.g., the Internet or World Wide Web. However, the system may be realized via private or local networks. The invention is not limited to any particular network.

As shown, the computer system 600 may be implemented in accordance with a processor 602, a memory 604, I/O devices 606, and a network interface 608, coupled via a computer bus 610 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, etc.) for entering data to the processing unit, and/or one or more output devices (e.g., speaker, display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

It is to be further appreciated that the present invention also comprises techniques for providing management services.

By way of example, a service provider agrees (e.g., via a service level agreement or some informal agreement or arrangement) with a service customer to provide management services. That is, by way of one example only, the service provider may host the customer's web site and associated applications (e.g., e-commerce applications). Then, in accordance with terms of the contract between the service provider and the service customer, the service provider provides management services that may comprise one or more of the methodologies of the invention described herein.

Accordingly, illustrative principles of the invention provide a method, a system, and a service (that is hosted in one system and analyzes and manages other systems as utilities) that manages system resources (e.g., computing resources, business/services resources, etc.) in a dynamic environment (e.g., computing environment) to achieve goal driven control (e.g., performance fairness, optimal resource allocation, for differentiated services) using an adaptive distributed control process. Such control process:

(i) uses a structured controller (e.g., goal driven integral control) to incorporate system uncertainty characterization (e.g., dynamics and randomness);

(ii) models (e.g., through control interval determination) the dynamic system using real time data (e.g., from bump test, from distribution) including system metrics indicative of the extent to which the goal is being achieved (e.g., performance metrics, delay, randomness) of the dynamic system;

(iii) determines controller parameters (e.g., deadzone, gain) including controller self-evaluation (e.g., through tuning history monitoring) to be agile to system uncertainty (e.g., randomness, variability); and (iv) achieves the goals (e.g., fairness, optimized allocation) for the dynamic system including consumers (e.g., a plurality of consumers) and resources (e.g., constrained resources, amount, granularity).

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for managing a computing system, the method comprising the steps of:

obtaining at least one measured performance metric from the computing system being managed;

generating at least one control input value based on parameters comprising a control error and a control deadzone such that uncertainty associated with the computing system is accounted for in accordance with the parameters, wherein the control error is determined from a computation comprising the at least one measured performance metric and at least one performance metric goal, and further wherein the control deadzone is defined such that the control input value is not generated when the control error is within the control deadzone; and sending the control input value to the computing system to effectuate achievement of the at least one performance metric goal associated with the computing system;

wherein the steps are performed by one or more processors.

2. The method of claim 1, wherein the step of generating the at least one control input value further comprises determining a parameter comprising a control interval.

3. The method of claim 2, wherein determination of the control interval is based on a mean response time, a standard deviation of the response time, a system throughput, and a desired ratio for the standard deviation of the response time divided by the mean response time.

4. The method of claim 1, wherein the step of generating the at least one control input value further comprises determining a parameter comprising a control step size.

5. The method of claim 1, wherein the performance goal is achieved when the control error is substantially equal to zero.

6. The method of claim 1, wherein a size of the control deadzone is computed as a function of a threshold limit value and the measured response time.

7. The method of claim 6, wherein the threshold limit value is adjusted based on a control input history.

8. The method of claim 7, wherein the control input history comprises data relating to at least one of an oscillation pattern and a chasing pattern.

9. A method for managing a computing system, the method comprising the steps of:

obtaining multiple measured performance metrics from the computing system being managed;

applying the multiple measured performance metrics to multiple controllers, wherein each controller generates at least one control input value based on parameters comprising a control error and a control deadzone such that uncertainty associated with the computing system is accounted for in accordance with the parameters, wherein the control error is determined from a computation comprising one of the multiple measured performance metric and a performance metric goal, and further wherein the control deadzone is defined such that the control input value is not generated when the control error is within the control deadzone; and sending one or more control input values computed by one or more of the multiple controllers to the computing system to effectuate achievement of one or more performance metric goals associated with the computing system;

wherein the steps are performed by one or more processors.

10. Apparatus for managing a computing system, comprising:

a memory; and at least one processor coupled to the memory and operative to: (i) obtain at least one measured performance metric from the computing system being managed; (ii) generate at least one control input value based on parameters comprising a control error and a control deadzone such that uncertainty associated with the computing system is accounted for in accordance with the parameters, wherein the control error is determined from a computation comprising the at least one measured performance metric and at least one performance metric goal, and further wherein the control deadzone is defined such that the control input value is not generated when the control error is within the control deadzone; and (iii) send the control input value to the computing system to effectuate achievement of the at least one performance metric goal associated with the computing system.

11. The apparatus of claim 10, wherein the operation of generating the at least one control input value further comprises determining a parameter comprising a control interval.

12. The apparatus of claim 11, wherein determination of the control interval is based on a mean response time, a standard deviation of the response time, a system throughput, and a desired ratio for the standard deviation of the response time divided by the mean response time.

13. The apparatus of claim 10, wherein the operation of generating the at least one control input value further comprises determining a parameter comprising a control step size.

14. The apparatus of claim 10, wherein the performance goal is achieved when the control error is substantially equal to zero.

15. The apparatus of claim 10, wherein a size of the control deadzone is computed as a function of a threshold limit value and the measured response time.

16. The apparatus of claim 15, wherein the threshold limit value is adjusted based on a control input history.

17. The apparatus of claim 16, wherein the control input history comprises data relating to at least one of an oscillation pattern and a chasing pattern.

18. A system, comprising:

a managed system; and a feedback control system coupled to the managed system and operative to: (i) obtain at least one measured performance metric from the managed system; (ii) generate at least one control input value based on parameters comprising a control error and a control deadzone such that uncertainty associated with the computing system is accounted for in accordance with the parameters, wherein the control error is determined from a computation comprising the at least one measured performance metric and at least one performance metric goal, and further wherein the control deadzone is defined such that the control input value is not generated when the control error is within the control deadzone; and (iii) send the control input value to the managed system to effectuate achievement of the at least one performance metric goal associated with the managed system.

19. A method for managing one or more resources associated with a system in a dynamic environment, comprising the steps of:

using a controller to incorporate a characterization of uncertainty associated with the system;

modeling the system using real time data including one or more system metrics indicative of an extent to which a goal is being achieved by the system;

determining one or more controller parameters including controller self-evaluation in order to be responsive to the system uncertainty; and causing the system goal to be achieved in accordance with the controller, the one or more system metrics, and the one or more controller parameters;

wherein at least one control input value is generated based on parameters comprising a control error and a control deadzone such that the uncertainty associated with the system is accounted for in accordance with the parameters, wherein the control error is determined from a computation comprising at least one measured performance metric and at least one performance metric goal, wherein the control deadzone is defined such that the control input value is not generated when the control error is within the control deadzone, and wherein the steps are performed by one or more processors.

* * * * *